(No Model.)

M. D. JONES.
HOSE COUPLING.

No. 431,167.　　　　　　　　　Patented July 1, 1890.

Witnesses.　　　　　　　　　Inventor.
Francis C. Stanwood　　　　　Melville D. Jones.
John A. Dougherty　　　　　　by H. E. Lodge Atty.

UNITED STATES PATENT OFFICE.

MELVILLE D. JONES, OF SOMERVILLE, MASSACHUSETTS.

HOSE-COUPLING.

SPECIFICATION forming part of Letters Patent No. 431,167, dated July 1, 1890.

Application filed April 16, 1890. Serial No. 348,184. (No model.)

*To all whom it may concern:*

Be it known that I, MELVILLE D. JONES, a citizen of the United States, residing at Somerville, in the county of Middlesex and State of Massachusetts, have invented certain new and useful Improvements in Hose-Couplings; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to hose-couplings, particularly that class employed where it is desired to unite the ends of rubber tubing or similar material. Such a device as embodies my invention is, more properly speaking, a "hose-mender," since it is to be applied interiorly to the rubber tubing, and is intended to enable a defective spot to be cut from a length of hose and then join the ends of the two pieces to form a perfect and continuous length; or it may be used in lieu of an ordinary pipe-coupling with a sleeve and threaded sections.

Figure 1:
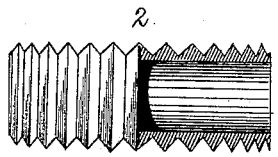
Figure 2:
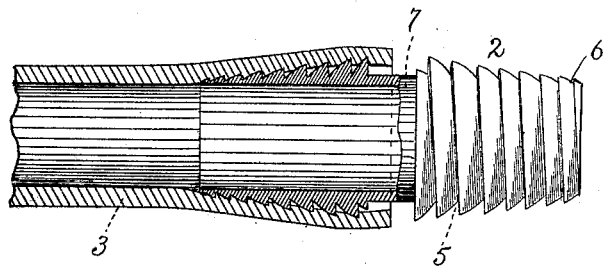
Figure 3:
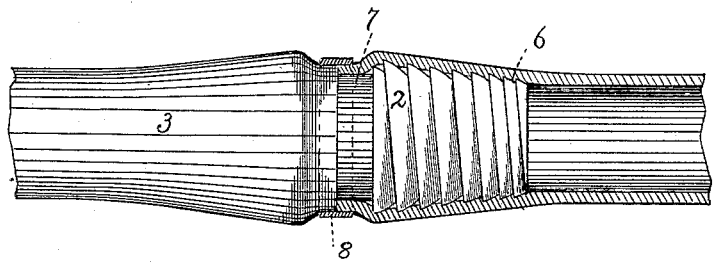

The drawings represent, in Figure 1, an elevation of a hose-coupling embodying my improvements, partly in section. Fig. 2 shows a coupling with the end of a piece of tubing attached. Fig. 3 is a view showing a sectional band employed to fasten the end of the tubing and employed in some instances.

The object of my invention, primarily, is to produce a hose-coupling which is cheaply made, readily applied, and one whereby the internal bore of the pipe or tubing is not diminished.

By reference to drawings I have indicated a hose-coupling at 2 as an entirety composed of a tubular casting, the bore of which is a cylinder, and of equal diameter or slightly larger than the size of pipe for which it is adapted. This casting, as shown in Fig. 2 in longitudinal section, is preferably formed thickest in the middle and gradually tapers to either end, where the metal is very thin. Thus, as seen in said figure, the bore or diameter of the pipe is not contracted—an object of the greatest importance.

To secure the hose 3 upon the coupling, a spiral thread is cut about the periphery of said coupling. Further, a peculiar and an important feature is found in the "pitch," so termed, of the screw-thread. This pitch is a constantly-varying one, greatest in the middle part of the coupling and becoming less toward the ends. On reference to Fig. 2, the threads are shown in cross-section as ratchet-formed by preference, since they offer the greatest resistance to prevent the end of the hose from being pulled off the coupling, and in this respect differ from the thread indicated in Fig. 1, which is V in cross-section.

To enable the coupling to be inserted within the hose easily, and, further, to permit it to be readily and properly fitted to create a tight joint, the screw-thread (see Fig. 2) is to be made tapering—that is, the depth of the thread, as shown at 5, is to be the greatest near the middle of the coupling and becomes less until it almost vanishes at either end. (See same figure at 6.) By this means the metal of the coupling at either end can be made very thin and the capacity of the tubing not diminished. Further, the pitch of said screw-thread, as before premised, is not the same throughout, but increases from the ends toward the middle, or inversely, as the depth of the thread. The object of these peculiar features is for the following reasons: first, the threads are tapered toward each end to enable the metal to be made very thin at the ends of the coupling, thus the capacity of the pipe or tubing at the point of coupling is not diminished; secondly, the threads are deepest in the middle, that they may enter more deeply the end of the hose, which is usually expanded and stretched at this point; hence the tubing is held more firmly than it would be otherwise, provided the same depth of thread existed; thirdly, the pitch of the screw-thread is increased from each end toward the middle in order to obtain the greatest pull at the point where such effect is desired—that is, the farther the piping advances upon the coupling the harder it goes and the more tightly the material clasps said coupling; hence it is here I desire that the increased pitch shall aid the operator.

It is to be noticed that the screw-thread formed upon either half of the coupling is the same—that is, either both right-handed or both left-handed, as is desired. In the use of old tubing, where the ends are much stretched, it is frequently desirable to secure the ends. For this purpose I have cut an annular groove 7, of considerable width, adapted to receive a spring-band 8 or a coil of wire. To effect this I have drawn the hose about the coupling until the ends overlap the screw-thread, and then apply the said spring-metal band. The latter is of considerable strength and crowds the ends down into the groove, making the fastening very effectual.

What I claim is—

1. A hose-coupling consisting of a tubular casting or short pipe provided with an exterior screw-thread, said screw-thread having a varying pitch greatest in the middle of said coupling and diminishing toward either end, substantially as stated and set forth.

2. A hose-coupling composed of a casting having a straight or cylindrical bore and exteriorly screw-threaded, said screw-threads tapering in depth from the center of said coupling toward the ends, and with a varying pitch increasing from the ends toward the middle, substantially as herein set forth.

3. A hose-coupling comprising a tubular casting having a central annular groove exteriorly, and with screw-threads from said groove to either end, said threads being both right-handed or both left-handed, diminished in depth from the middle of the coupling outwardly, and with reversely-varying pitch, substantially as and for purposes described.

In testimony whereof I affix my signature in presence of two witnesses.

MELVILLE D. JONES.

Witnesses:
FRANCIS C. STANWOOD,
H. E. LODGE.